(12) United States Patent
Heinze et al.

(10) Patent No.: US 12,247,690 B2
(45) Date of Patent: Mar. 11, 2025

(54) CLAMP SLIDE RAIL MOUNTING DEVICE

(71) Applicant: BETTER BASICS LABORBEDARF GMBH, Dresden (DE)

(72) Inventors: Marcus Heinze, Dresden (DE); Sebastian Stein, Dresden (DE); Mario Schneider, Dresden (DE)

(73) Assignee: BETTER BASICS LABORBEDARF GMBH, Dresden (DE)

( * ) Notice: Subject to any disclaimer, the term of this patent is extended or adjusted under 35 U.S.C. 154(b) by 0 days.

(21) Appl. No.: 18/711,864

(22) PCT Filed: Nov. 30, 2022

(86) PCT No.: PCT/EP2022/083958
§ 371 (c)(1),
(2) Date: May 20, 2024

(87) PCT Pub. No.: WO2023/099628
PCT Pub. Date: Jun. 8, 2023

(65) Prior Publication Data
US 2024/0328568 A1    Oct. 3, 2024

(30) Foreign Application Priority Data

Nov. 30, 2021   (LU) ........................ 500933

(51) Int. Cl.
*F16M 11/04*   (2006.01)
*F16M 13/02*   (2006.01)

(52) U.S. Cl.
CPC ........ *F16M 11/041* (2013.01); *F16M 13/022* (2013.01)

(58) Field of Classification Search
CPC .......................... F16M 11/041; F16M 13/022
See application file for complete search history.

(56) References Cited

U.S. PATENT DOCUMENTS

| 3,093,094 | A | * | 6/1963 | Oztekin | ............... | A47B 57/045 |
| | | | | | | 248/242 |
| 5,042,672 | A | * | 8/1991 | Mehlin | ................. | A47B 57/04 |
| | | | | | | 211/42 |
| 5,598,997 | A | * | 2/1997 | Marquardt | ........... | A62B 25/005 |
| | | | | | | 248/311.3 |
| 5,960,965 | A | | 10/1999 | Saunders | | |

(Continued)

OTHER PUBLICATIONS

ISA (EPO), Written Opinion for PCT/EP2022/083958, Mar. 17, 2023.
ISA (EPO), International Search Report for PCT/EP2022/083958, Mar. 17, 2023.

*Primary Examiner* — Monica E Millner
(74) *Attorney, Agent, or Firm* — Hemisphere Law, PLLC; Zhigang Ma

(57) ABSTRACT

The invention relates to a clamp slide rail mounting device for the reversible attachment of a mounting slide within a profile rail, where one or more objects can be attached to the mounting slide and the mounting slide can be guided within the profile rail. The mounting slide features a spring latching element with spring latching element depressions, which is placed within a groove with groove latch projections, where a rotation of the spring latching element around a spring latching element longitudinal axis causes the groove latch projections to engage form-fittingly into the spring latching element depressions.

20 Claims, 11 Drawing Sheets

(56) References Cited

U.S. PATENT DOCUMENTS

Figure 1:
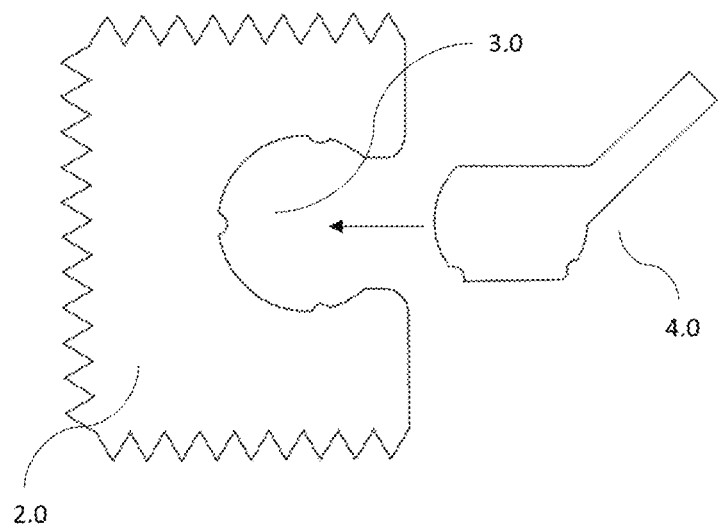
Figure 1:
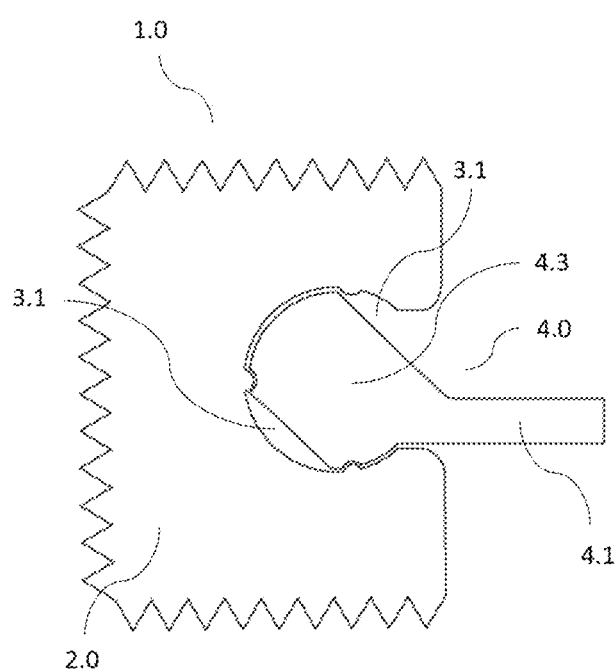

| | | | | |
|---|---|---|---|---|
| 6,932,226 B2* | 8/2005 | Hardy | ............... | A47F 5/0068 |
| | | | | 248/225.11 |
| 7,980,400 B2* | 7/2011 | Kao | ............... | A47F 5/0807 |
| | | | | 211/70.6 |
| 9,247,810 B2* | 2/2016 | Metzler | ............... | A47B 88/427 |
| 10,300,833 B2* | 5/2019 | Alexander | ............... | F16B 2/22 |
| 2006/0053731 A1* | 3/2006 | Branca | ............... | F16B 21/02 |
| | | | | 52/690 |
| 2007/0209265 A1* | 9/2007 | Robb | ............... | G09F 3/204 |
| | | | | 40/658 |
| 2011/0169386 A1* | 7/2011 | Hardy | ............... | A47B 96/067 |
| | | | | 312/246 |
| 2012/0273633 A1* | 11/2012 | Henriott | ............... | A47B 96/067 |
| | | | | 29/428 |
| 2015/0028174 A1* | 1/2015 | Carnevali | ............... | F16M 11/14 |
| | | | | 248/316.1 |

\* cited by examiner

A

B

CLAMP SLIDE RAIL MOUNTING DEVICE

CROSS-REFERENCE TO RELATED APPLICATIONS

This application is a National Stage entry under § 371 of International Application No. PCT/EP2022/083958, filed on Nov. 30, 2022, and which claims the benefit of priority to Luxembourg Patent Application No. LU500933, filed on Nov. 30, 2021. The content of each of these applications is hereby incorporated by reference in its entirety.

TECHNICAL FIELD

The invention relates to a clamp slide rail mounting device for the reversible attachment of a mounting slide within a profile rail, where one or more objects can be attached to the mounting slide, and the mounting slide can be navigated within the profile rail.

BACKGROUND ART

Construction profiles (also known as hollow chamber profiles, mounting profiles, groove profiles), C-groove rails, T-groove rails, or keder profile rails are known in the art, available in various embodiments. These profile rails are manufactured through an extrusion process and have at least one groove.

Within this groove, so-called sliding nuts can be positioned. These are designed to enable the connection of an element with the groove and thereby to the profile rail. Thus, the element can be connected to the T-groove via a screw connection.

Furthermore, sliding nuts with a thread and lateral clamping jaws are known, which can be placed within a groove. Turning a screw causes the clamping jaws to diverge, thereby fixing the sliding nut within the groove.

However, if you want to connect an object to the profile rail using a sliding nut as described, a screw connection is disadvantageous, as it is not possible to attach the object quickly and easily.

Profile rails are also often used for attaching flat elements. Angle rails known to form-fit with a T-groove rail are an example. The flat element has the angle rail at its outer edge. This is hooked into the groove. The process involves holding the flat element with both hands and guiding, slightly rotating, and lowering the angle rail into the groove. To remove the angle rail from the groove, the process is reversed. A disadvantage of this is that it often leads to jamming, and the angle rail cannot be lifted out of the groove without resistance. Furthermore, the flat element/angle rail must be handled with both hands for as resistance-free an insertion/removal into/from the groove as possible, so that one-handed attachment or removal of the angle rail is not possible.

The U.S. Pat. No. 5,960,965 A discloses a merchandise display system featuring a carrier plate on which the product to be displayed is placed. The carrier plate has a protrusion at one end that can be inserted into the groove of a channel such that the protrusion is slidably guided within the groove. A setscrew positioned opposite the groove opening is used to frictionally secure the inserted protrusion. This arrangement disadvantageously limits the load-bearing capacity of the carrier plate with the weight of the displayed product to the extent that the clamping action induced by the setscrew is overcome, causing the carrier plate to shift angle. Moreover, simple insertion or removal of the protrusion into or from the groove is not feasible since the resistance dictated by the width of the groove opening must be overcome. Additionally, a tool is required to operate the setscrew.

The WO 2013/052975 A1 discloses a device for storing utensils, especially tools, in a storage shell. A storage shell can be hooked into a rail with a receiving groove in at least two angular positions. For this purpose, the storage shell unit has at least one lug that facilitates connection of the storage shell unit with the rail by inserting the lug into the receiving groove of the carrier unit. A disadvantage of this is that correctly positioning the appropriate lug into the receiving groove to achieve the desired angular position often does not succeed on the first attempt. Moreover, the storage shell unit is complex in design and therefore costly to produce. Additionally, the arrangement requires that the connector completely encompasses the profile to ensure stable hanging of the connector on the profile. This arrangement prevents the profile from being flush-mounted on a wall, as the edges of the profile groove must always protrude sufficiently from the wall to allow engagement of the connector for securing the device on the profile rail.

The DE 100 57 351 A1 discloses a holding device for a sensor. The holding device features a rail with a groove into which a sliding nut can be inserted. For a stable connection, however, the sliding nut must be clamped within the groove using an adjusting element, which consists of a nut-bolt connection. Rapid insertion and removal of the sliding nuts and, in particular, removal of the sensor from the holding device are thus not feasible. Furthermore, a tool is required to secure the sensor to the holding device.

The EP 0 976 937 A2 discloses a joint arrangement for machine tools for positioning the tool and workpiece relative to each other. The device features a joint part within a housing that can pivot within a limited range inside the housing. The device is designed to provide a clear determination of the pivot center. The joint part has a through-hole passing through the pivot center. Below the housing, a flanged bushing is centrally positioned relative to the pivot center. Using an adjustment pin that passes through the through-hole and the flanged bushing, the pivot center can be determined. However, the joint part is form-fittingly positioned within the housing and cannot be easily removed. Moreover, the device does not allow flexible shifting of the joint part along the longitudinal axis of the housing.

Objective

Therefore, the objective of the present invention is to provide a device that allows for an easier and quicker attachment of a mounting slide within a profile rail. Furthermore, the attachment should be possible without the mounting slide tilting within the groove of the profile rail. At least one object should be attachable to the mounting slide.

Solution

The objective is achieved by a clamp slide rail mounting device with the features of claim 1. Further advantageous embodiments are disclosed in the dependent claims and the description.

General Advantages

The inventive device permits an object to be reversibly and quickly form-fittedly connected with a profile rail via a mounting slide that has a spring latching element. The attachment can be performed with one less step since the mounting slide, or more precisely its spring latching element, does not have to be lowered into the groove, unlike an angle rail, thus preventing tilting. Furthermore, the user receives haptic feedback when the mounting slide is successfully connected to the profile rail.

Additional advantages are disclosed in the description and the exemplary embodiments.

INVENTION DESCRIPTION

The inventive clamp slide rail mounting device, also referred to as the device, comprises at least one profile rail and at least one mounting slide. The mounting slide can be reversibly attached to the profile rail. Reversible attachment is understood to be a detachable connection of at least two elements.

The clamp slide rail mounting device has at least one profile rail (2.0). The person skilled in the art is familiar with a variety of profile rails (e.g., T-groove rail, C-groove rail, keder profile rails), essentially comprising a longitudinal element within which at least one groove (3.0) is arranged, extending along the longitudinal axis of the profile rail. In cross-section to the longitudinal axis of the profile rail, the groove may have, for example, a T-shaped or substantially C-shaped profile. In a particularly preferred embodiment, the groove has a substantially circular profile in cross-section. In another embodiment, the groove may have a substantially oval or polygonal profile, such as triangular or square. Combinations thereof are also conceivable. Thus, a groove in cross-section may also have a partially oval and square profile. The profile may also be polygonally configured.

The person skilled in the art is familiar with profile rails that comprise several parallel arranged grooves. In one embodiment, the grooves along the longitudinal axis of the profile rail may also be interrupted.

Preferably, the groove comprises a groove cavity, groove depth, groove width, groove opening, groove opening edge, and groove opening width. The groove cavity (3.1) refers to the hollow space of the groove. A groove has a groove depth (3.2), which denotes the distance between the profile rail surface and the deepest point of the groove. The deepest point of the groove is referred to as the groove base (3.3). Furthermore, a groove has a groove width (3.4), where the groove depth and groove width can essentially have the same dimensions. The dimensions of the groove cavity are limited by the groove depth and groove width.

Furthermore, a groove comprises a groove opening (3.5), through which an object (e.g., a mounting slide, see below) can be introduced into the groove cavity. Therefore, the groove opening establishes a fluid connection between the groove cavity and the space outside the profile rail. The groove opening has a groove opening width (3.6), where the measurement of the groove opening width may correspond to that of the groove width. Preferably, the measurement of the groove opening width is at least 10%, particularly preferably at least 20%, and most preferably at least 30% smaller than that of the groove width. Furthermore, preferably, the measurement of the groove opening width is at least 15% to 30%, particularly preferably at least 20% to 30%, and most preferably 25% smaller than that of the groove width. A smaller groove opening width preferably leads to a more stable attachment of the mounting slide within the groove. The thickness of the mounting element defined further below, the groove opening width, and the angle of insertion of the mounting slide defined further below into the groove are interdependent. Thus, the groove opening width can be smaller if the thickness of the mounting element is also smaller. Furthermore, the angle of insertion (see below) at which the mounting slide is inserted into the profile rail can be larger if the thickness of the mounting element is smaller and/or the groove opening width is larger.

The groove opening is limited by at least two groove opening edges (3.7) that are spaced opposite each other, where the groove opening width essentially has the distance between the groove opening edges to each other. A groove opening edge can be chamfered or rounded, which advantageously results in an increased contact surface of the mounting slide. Another advantage is that the mounting slide can be moved more easily in the groove.

Preferably, a profile rail is used whose groove has a groove opening with a groove opening width whose dimension is smaller than that of the groove width. This advantageously results in a better form-fit connection of the mounting slide with the profile rail. However, embodiments of grooves are also conceivable in which the groove opening width corresponds to the groove width. This advantageously allows better access to the groove cavity (e.g., for cleaning purposes).

In a particularly preferred embodiment, the groove has a concave curvature (2.1) in cross-section, or is at least partially concavely configured. Such a shape results, for example, when the groove has a circular or oval profile in cross-section.

The inventive device comprises a mounting slide (4.0) that can be reversibly attached to the profile rail by being arranged in the groove and preferably can be moved essentially without resistance along the longitudinal axis of the groove until at least one spring latching element comes into engagement with a groove latch elevation during intended use. In one embodiment, even after engagement of the mounting slide, smooth shifting of the mounting slide within the groove is possible.

The mounting slide preferably comprises at least one mounting element (4.1). Various objects can be attached to the mounting element, or the mounting element is formed as part of an object. The mounting element may, for example, be provided with holes or threaded holes, which allow the reversible or permanent attachment of objects. Furthermore, the mounting element may be formed from several components that are connectable to one another in a form-fitting and/or force-fitting and/or materially-bonded manner. Moreover, the mounting element can be designed in any manner, whereby the design of the mounting element depends on the type of connection of an attachable object as well as the shape of the object. Upon successful attachment of the mounting slide to the profile rail, the mounting element's central axis (4.2) is oriented perpendicularly to the profile rail surface (2.2) in a preferred embodiment. However, depending on the desired or required configuration of the mounting element, it may also be positioned at a different angle. In another embodiment, the angle of the mounting element's central axis can be variably adjusted. This can be achieved, for example, through a lockable joint.

Furthermore, the mounting slide has a spring latching element (4.3), which can be positioned within the groove cavity. The primary purpose of the spring latching element is to connect the mounting slide to the groove in such a manner that the mounting slide cannot fall out of the groove and is form-fittingly connected with the groove, i.e., the profile rail. The spring latching element comprises a spring latching element central axis (4.4), which, when the spring latching element is inserted into the groove, is oriented substantially perpendicular to the profile rail surface. The spring latching element central axis and the mounting element central axis can be oriented at an angle to each other or parallel to each other.

In a preferred embodiment, the spring latching element is inflexible, that is, it is made from a solid material. The use of a solid material advantageously results in greater stability than an element that, for example, comprises two clamping jaws with which the element is attached in the groove. The use of a solid material also advantageously allows the element to be formed in one piece and does not have any further mechanical components that can be subject to wear. Advantageously, in this embodiment, the spring latching element can also be obtained in a single process step, e.g., through injection molding or 3D printing, especially without the need for elaborate post-processing.

According to a preferred embodiment of the invention, the spring latching element partially or completely forms an edge (e.g., a longitudinal edge or a width edge) of the mounting slide. Between the mounting element and the spring latching element, a groove opening edge support rail (4.5) is preferably arranged. In a particularly preferred embodiment, the mounting slide is attached to the profile rail via the spring latching element and the groove opening edge support rail. Upon successful attachment of the mounting slide, the groove opening edge support rail contacts a groove opening edge. The groove opening edge support rail can be designed such that its contour follows that of the groove opening edge. For example, the contour of the groove opening edge support rail can follow the contour of a chamfer of the groove opening edge.

The groove opening edge support rail cannot be precisely delineated from the spring latching element and the holding element. Essentially, the groove opening edge support rail encompasses the area of the mounting slide, which contacts a groove opening edge upon successful attachment. The groove opening edge support rail has a groove opening edge support rail longitudinal axis (3.8).

In one embodiment, the spring latching element in cross-section has a convex curvature positioned distally to the groove opening edge support rail. This convex curvature is also referred to as a spring latching element projection. The convex curvature serves as a so-called pressure point, which, upon being overcome, generates haptic feedback as described below. Additionally, such a convex curvature, in conjunction with a concave curvature, allows for the locking/fixing of the spring latching element within the groove.

In a particularly preferred embodiment, the groove in cross-section comprises a concave curvature (2.1) and the spring latching element a convex curvature (4.6), wherein the arcs of the concave curvature and the convex curvature essentially share the same center point when the spring latching element is placed in the groove cavity.

To attach the mounting element to the profile rail, the spring latching element is inserted into the groove and partially rotated around the midpoint of the circular arcs about a spring latching element longitudinal axis (4.7) until at least one groove latch projection (3.9, 3.11) engages into a spring latching element depression (4.8, 4.10) in a reversible form-fitting and/or force-fitting manner. The spring latching element longitudinal axis does not have to coincide with its geometric center (related to the cross-section of the spring latching element). In alternative embodiments of the spring latching element, the spring latching element longitudinal axis can, for example, be located closer to the groove opening edge support rail than to the geometric center of the spring latching element.

In a preferred embodiment, the device for reversibly fastening a mounting slide to a profile rail comprises at least one mounting slide and at least one profile rail, where the profile rail has at least one groove. This groove encompasses a groove cavity, groove depth, groove base, groove width, groove opening, and at least one groove opening edge. The mounting slide can be arranged within the groove and has at least one mounting element and at least one spring latching element opposite the mounting element. The mounting slide incorporates a groove opening edge support rail, and the spring latching element is partially rotatable around its longitudinal axis within the groove. The spring latching element can be reversibly connected to the groove.

In a preferred embodiment, the device for reversibly fastening a mounting slide to a profile rail comprises at least one mounting slide and at least one profile rail, where the profile rail has at least one groove. This groove encompasses a groove cavity, groove depth, groove base, groove width, groove opening, and at least one groove opening edge. The mounting slide can be arranged within the groove and has at least one mounting element and at least one spring latching element opposite the mounting element. The mounting slide incorporates a groove opening edge support rail, and the spring latching element is partially rotatable around its longitudinal axis within the groove. The spring latching element can be reversibly connected to the groove, or wherein at least one spring latching element projection is operatively connected to a groove opening edge.

In a further preferred embodiment, the apparatus has similar components, wherein at least one spring latching element depression is functionally connected with at least one groove latch projection. This connection enables reversible attachment of the mounting slide to the profile rail, where the mounting slide and the profile rail are structurally designed to accommodate such engagement.

According to another preferred embodiment, the device has at least one mounting slide and at least one profile rail, wherein the profile rail has at least one groove with characteristics as previously described. The mounting slide can be positioned within the groove and has at least one mounting element and one spring latching element, which is also partially rotatable about its longitudinal axis within the groove. The apparatus ensures that the spring latching element is functionally connected with a groove opening edge or at least one groove latch projection, facilitating a reversible connection.

The spring latching element preferably has at least one depression, particularly a spring latching element depression (e.g., concave curvatures), while the profile rail has at least one protrusion, particularly a groove latch projection (e.g., convex curvatures), which is complementary to the depressions of the spring latching element. This design simplifies cleaning of the groove and, in conjunction with a complementary curvature, secures the spring latching element within the groove of the profile rail.

Further, in a preferred embodiment, the device for reversibly fastening a mounting slide to a profile rail has one mounting slide and at least one profile rail as previously outlined, but with an additional connection where at least one spring latching element depression is functionally connected with at least one groove latch projection, or at least one spring latching element projection is functionally connected with a groove opening edge. It is preferable that the spring latching element does not encompass the profile rail, particularly any wall (also known as a boundary ridge) of the profile rail, and that the stable and reversible attachment of the mounting slide is exclusively achieved through the engagement of the spring latching element into the groove and the groove opening edge support rail resting on the groove opening edge.

The spring latching element and the mounting slide are designed such that neither the spring latching element nor any other part of the mounting slide encompasses the profile rail, particularly any wall of the profile rail. The groove opening edge support rail preferably rests on the groove opening edge without encircling it or at least partially framing it.

The mounting slide preferably has exactly one spring latching element. This feature allows the mounting slide to be attached to the profile rail without tilting, for example, by spring latching elements that are stacked or otherwise offset relative to each other on the mounting slide.

In a further embodiment, the mounting slide has more than one spring latching element, specifically at least two or exactly two, preferably at least three or exactly three, and most preferably at least four or exactly four spring latching elements. Each additional spring latching element is arranged on a radius around the longitudinal axis of the spring latching element next to another spring latching element. This arrangement allows the mounting slide, once inserted, to be positioned in various angular positions relative to the orientation of the profile rail, for instance, in a plane parallel alignment or in an angled position relative to an orthogonal plane imagined along the length of the groove of the profile rail. This setup permits fine adjustment of inclination angles such as 0° (i.e., plane parallel alignment of the mounting slide to the orthogonal on the profile rail), 25°, 50°, and 75°.

According to a specific configuration, if the mounting slide has more than one spring latching element, the elements are preferably identically shaped but differ only in the aforementioned angular positions.

In another specific configuration, if the mounting slide has more than one spring latching element, these elements are not identically shaped but have different dimensions. This variation enables the mounting slide to be attached in different grooves.

To ensure that the mounting slide, when inserted, can be positioned in various angular positions relative to the orientation of the profile rail, a further preferred embodiment of the invention provides that the groove of the profile rail along the groove base and according to the cross-sectional profile of the groove has at least two successive curvatures, particularly directly successive curvatures, that are preferably complementary to a curvature on the spring latching element. This design allows controlled rotation of the spring latching element within the groove from a first position, defined by the arrangement of the first curvature along the groove base proximally to the groove opening edge, to a second position, defined by the arrangement of the second curvature along the groove base distally to the groove opening edge. The curvatures are preferably designed to interlock such that the spring latching element is securely fixed within the groove or the groove cavity of the profile rail. It is understood by those skilled in the art that in addition to the two consecutively arranged curvatures, further curvatures, such as a third or fourth curvature, may be provided from the proximal arrangement to the groove opening edge to the distal direction to the groove opening edge along the groove base, allowing for the adjustment of various inclination angles by transferring the curvature on the spring latching element from the first curvature to the second curvature and possibly to each further curvature along the groove base. For example, this allows finer inclination angles of 0° (i.e. plane-parallel alignment of the mounting slide to the orthogonal to the profile rail), 5°, 10° and 15° to be set. In this case, the groove opening edge support rail preferably serves as a safety feature that, especially when heavy objects are mounted on the device, prevents undesirable breakthrough, such as tipping, of the mounting slide within the groove or even its dislodging. The expert knows how to design the curvatures according to the materials used to ensure safe and/or smooth transfer of the curvature on the spring latching element from one position to a second and possibly further positions, as well as to secure the locking/fixing of the spring latching element within the groove or the groove cavity of the profile rail. It may also be provided that the spring latching element has at least a second and/or further curvature, which are positioned equivalent and/or equidistant to the curvatures of the groove base of the profile rail (as defined herein). This arrangement, when several curvatures engage with each other, enhances the functional connection and thus the locking/fixing of the spring latching element within the groove or the groove cavity of the profile rail. Preferably, the groove base features convex curvatures (e.g., groove latch projections), which are preferably complementary to a curvature, particularly a concave curvature, on the spring latching element of the mounting slide. Regardless, it may also be provided that the spring latching element of the mounting slide features convex curvatures (e.g., spring latching element projections), which are preferably complementary to a curvature, particularly a concave curvature, on the groove base of the profile rail.

In a preferred configuration, the spring latching element is designed to be insertable into the mounting slide. This design advantageously allows spring latching elements of different shapes and dimensions to be used in the same mounting slide to accommodate them in differently shaped or dimensioned grooves.

As the mounting slide, particularly the spring latching element, can be attached to the profile rail without the spring latching element or any other part of the mounting slide encompassing the profile rail, particularly any wall (also known to the expert as a boundary ridge) of the profile rail, it can advantageously be achieved that the profile rail can be flush-mounted in a wall and the groove is the only interruption in the wall plane. Thus, the mounting slide can be mounted on a wall that has a groove or in which at least one groove is arranged and/or embedded without having any boundary ridges, especially free-standing boundary ridges. Independently, at least one slide locking recess (as defined herein) may be provided in a boundary ridge, particularly in a non-free-standing boundary ridge, preferably only superficially provided.

In a preferred embodiment, the spring latching element and the mounting element are rotatable about the longitudinal axis of the spring latching element. This arrangement results in movement on a circle imagined around the longitudinal axis of the spring latching element on the side of the mounting element being converted into movement on the side of the longitudinal axis of the spring latching element. The choice of distance between the spring latching element and the mounting element—where these cannot be clearly differentiated as they are part of the same structural unit, the mounting slide—can influence the leverage effect, which is causative for overcoming the pressure point. Thus, with a greater leverage effect, the pressure point can be designed to be more difficult to overcome.

The pressure point or a protrusion is preferably designed such that overcoming the pressure point is solely dictated by the elasticity of the material used. Thus, openings beneath the spring latching element projection can be omitted, making the spring latching element more robust.

In a further preferred embodiment, the device has at least one spring latching element depression, which is functionally connected with at least one groove latch projection as described further below. The operation is the same as described for the spring latching element projection, only related to the groove latch projection.

A form-fitting engagement (also: connection) of the spring latching element into a groove is to be understood here as the edge of a spring element latching recess and a groove latch projection being designed as operative pressure contacts. Preferably, the dimensions and tolerances of the spring latching element and the groove latch projection are selected so that manual insertion of the mounting slide into the groove and its rotation therein until the form-fitting engagement is possible. Due to the chosen dimensions, the user receives tactile feedback as soon as at least one groove latch projection engages into a spring element latching recess, once a pressure contact is overcome. In one embodiment, a groove opening edge support rail is shaped to at least encompass one latching recess into which a groove latch projection can engage. This intervention involves analogous descriptions for at least one spring element locking recess and at least one groove latch projection further below.

Haptic feedback can also occur when at least one spring latching element projection is functionally connected with a groove opening edge, as described further below.

As further detailed below, a projection may also be a depression, specifically a spring latching element projection may be a spring latching element depression, and a depression may also be a projection, specifically a groove latching recess may be a groove latch projection.

In one embodiment, the shape of the spring latching element or the groove opening edge support rail during the reversible connection or removal of the mounting slide in or from the groove provides haptic feedback. This haptic feedback informs the user of the device when the reversible attachment of the mounting slide to the profile rail is achieved. This may also be accompanied by an acoustic feedback, for example, an audible click.

Partial rotation is understood to mean that rotation can only occur within a limited range and not 360° around a center point, such as the center of the arcs. To secure the mounting slide to the profile rail as intended, the spring latching element is positioned within the groove and rotated around the spring latching element's longitudinal axis until the groove opening edge support rail contacts a groove opening edge.

In one embodiment, upon completion of the partial rotation, a reversible form-fit connection of the spring latching element with the groove is achieved, through an engagement described above of at least one groove latch projection into a spring latching element depression and/or contacting the groove opening edge.

In a preferred embodiment, the central axis of the spring latching element can be rotated by 45° around its longitudinal axis. Depending on the design of the groove latch projections and spring latching element depressions described below, angles deviating from 45° rotation are also possible and are not limited to a 45° rotation.

In one embodiment, the spring latching element has a top surface that is delineated from the convex curvature by an upper edge of the spring latching element. In a preferred configuration, the spring latching element has a top side (4.11) and a bottom side (4.12), which are preferably arranged parallel to each other. It may also be desired for the top side of the spring latching element, for example, to have a concave curvature in cross-section, or to be designed differently.

The top surface of the spring latching element may be designed with a concave (curved) cross-section, advantageously resulting in material and weight savings. Alternatively, or in combination with the concave top surface of the spring latching element, the bottom surface of the spring latching element can also be designed similarly curved.

In a preferred embodiment, the thickness of the spring latching element is less than the width of the groove opening. This allows for resistance-free insertion of the spring latching element into the groove.

To ensure frictionless insertion of the spring latching element into the groove during intended use, it is beneficial for the thickness of the spring latching element, i.e., the distance between the top and bottom surfaces of the spring latching element, to be less than the width of the groove opening. Preferably, the thickness of the spring latching element is designed to be at least 15% less, more preferably at least 12% less, even more preferably at least 10% less, and further more preferably at least 5% less than the width of the groove opening. This advantageously results in minimal play between the spring latching element and the material of the profile rail during insertion.

It may also be desirable for the thickness of the spring latching element to match or exceed the dimension of the groove opening width. To still allow for the resistance-free insertion of the spring latching element into the groove, the spring latching element can be made of a material that contracts sufficiently when cooled so that the spring latching element can be guided through the groove opening into the groove cavity without resistance. In a heated state, where the temperature preferably corresponds to the ambient temperature (e.g., room temperature), the spring latching element can expand and form-fit connect the mounting slide temperature-dependently with the profile rail. Advantageously, this configuration ensures that the spring latching element cannot be removed from the groove when cooled.

In a preferred embodiment, the thickness of the groove opening edge support rail is less than the thickness of the spring latching element. This advantageously simplifies or even enables partial rotation. The thickness of the groove opening edge support rail may equal the thickness of the mounting element, or be less than it. Preferably, the thickness of the mounting element is at least 50% less, more preferably at least 60% less, and most preferably at least 65% less than the thickness of the spring latching element. A specialist will select the thickness of the groove opening edge support rail based on the required stability demands. Furthermore, the specialist can also adjust the thickness of the mounting element to meet the required stability demands of the mounting element.

In one embodiment, the thickness of the groove opening edge support rail may correspond to the width of the spring latching element. For example, the mounting slide may be designed as an angled element. It is also conceivable that the thickness of the groove opening edge support rail is greater than the thickness of the spring latching element. This may also be designed so that it does not have any spring latching element depressions. The groove opening edge support rail, which may have at least one latching element depression, can be placed on a groove opening edge. Here, the spring latching element limits partial rotation by contacting either a groove latch projection or by contacting, for example, a concavely formed groove opening edge, allowing the mounting slide, designed as an angled element, to thus be secured in the groove.

Accordingly, the thickness of the groove opening edge support rail is less than, equal to, or greater than the thickness of the spring latching element. A lesser thickness can save material. A greater thickness provides increased stability, which is particularly advantageous when the lever effect described above is significant. This can prevent breakage of the mounting slide between the spring latching element and the mounting element.

The spring latching element has at least a first spring latching element depression (4.8), which is in operative connection with a first groove latch projection (3.9). In its intended use, the spring latching element is rotated within the groove until the groove opening edge support rail contacts the groove opening edge and/or at least a first groove latch projection engages with at least a first spring latching element depression. In a preferred embodiment, the groove has at least one groove latch projection, and the spring latching element has at least one spring latching element depression. Those skilled in the art will recognize that these two elements can also be present in an inverted form in an alternative embodiment. Thus, the groove may have at least one groove recess, and the spring element may have at least one spring latching element projection. Furthermore, combinations are conceivable in such a way that both the groove and the spring latching element comprise at least one recess and at least one elevation. In another embodiment, there may also be no groove latch projections and/or spring latching element depressions present. Additionally, an elevation can be designed as a recess and vice versa.

In a preferred embodiment, a first spring latching element depression is arranged proximal to the groove opening edge support rail. Herein, "proximal" is understood to mean that a point has a shorter distance to a reference point than a point that is further away from the reference point, i.e., distal. For example, a point halfway along the radius of a circle can be described as proximal to the center of the circle, whereas a point on the circumference of the circle can be understood as distal to the center.

Herein, the reference point for stating distal/proximal shall be the groove opening edge support rail, or the longitudinal axis of the groove opening edge support rail, respectively. In a preferred embodiment, the first spring latching element depression is arranged proximal to the groove opening edge support rail, where a first groove latch projection is also oriented proximal to the groove opening edge support rail.

In a preferred embodiment, the first groove latch projection, which is oriented proximally to the groove opening edge support rail, can engage form-fittingly into the first spring latching element depression. This provides a defined haptic feedback as herein described. The designations "first," "second," "third," and terms equivalent to these are chosen freely and serve to clarify the description, particularly the definition of the position indications of the groove latch projections and spring latching element depressions.

In one embodiment, the groove has at least a first groove latch projection and/or a second groove latch projection, which are oppositely positioned and separated by the groove cavity. The groove latch projections allow the functionally connected engagement of the spring latching element projections into them to enable, among other things, the haptic feedback.

A second groove latch projection (3.10) can be arranged directly opposite the first groove latch projection, with the groove cavity separating them from each other. Thus, the second groove latch projection is positioned distally to the groove opening edge support rail/longitudinal axis of the groove opening edge support rail.

In a preferred embodiment, the spring latching element comprises a convex curvature (4.6) positioned distally to the groove opening edge support rail. This curvature may, but does not have to, have the same degree of curvature as the concave curvature of the groove. Advantageously, the same curvature allows the spring latching element to be rotatable within the groove with minimal play. Here, the same curvature is understood to mean that the arcs followed by the convex or concave curvatures are concentric, and their diameters differ as little as possible, resulting in only minimal play between the spring latching element and the groove.

In a circular design of the groove, its cross-section can be understood as a circular area, whose center essentially coincides with the geometrical center of the spring latching element, or the longitudinal axis of the spring latching element. The diameter of the circular area essentially corresponds to the width of the groove. The at least one groove latch projection or the groove latch projections is/are essentially arranged along the circumference of the circular area of the groove. Herein, the groove opening center (3.12), positioned at half the width of the groove opening width, on the circular area is to define the angle of 0°. The first groove latch projection is preferably arranged in an angular range between 50° and 95°, more preferably between 70° and 85°, and most preferably at 78°.

A second groove latch projection can be essentially opposite the first groove latch projection. The second groove latch projection is arranged on the circumference of the circular area in an angular range of preferably between 265° and 310°, more preferably between 275° and 290°, and most preferably at 282°. The position of the second groove latch projection can be described as distal to the groove opening edge support rail/the longitudinal axis of the groove opening edge support rail.

In another embodiment, the groove may have a third groove latch projection (3.11) arranged on the circumference of the circular area within a preferred angular range of between 160° and 220°, more preferably between 190° and 210°, and most preferably at 180°. The presence of a third groove latch projection advantageously reduces the play between the spring latching element and the groove. The third groove latch projection can engage an optionally present third spring latching element depression (4.10), which is arranged distally to the groove opening edge support rail/the longitudinal axis of the groove opening edge support rail. The third groove latch projection is essentially located at the deepest point of the groove depth, the groove bottom (3.3). Furthermore, an advantageous aspect of arranging the groove latch projection at an angle of 180° is that the spring latching element can also be attached in an inverted (mirrored) manner in the groove.

In a preferred embodiment, the groove has a third groove latch projection, which is spaced apart from the first and second groove latch projections and positioned at the base of the groove. The third groove latch projection enables the haptic feedback as described herein.

In a modified embodiment, the third groove latch projection can be arranged at an angle smaller than 180° (e.g., at 160°), while a fourth groove latch projection is arranged at an angle greater than 180° (e.g., at 200°). This advantageously allows the spring latching element to be attached in an inverted manner in the groove and additionally stabilized.

Further angle ranges and angles differing from those specified above are possible. Likewise, the number of groove latch projections and spring latching element depressions can be varied. For example, additional groove latch projections/spring latching element depressions can advantageously serve to provide additional stability of the mounting slide within the groove.

Further advantageously, additional groove latch projections and Spring Element Depressions can enable additional haptic feedback. With an increasing number of groove latch projections and Spring Element Depressions, these can be designed with lesser height. Simultaneously, additional groove latch projections and Spring Element Depressions facilitate a better force-fit connection of the spring latching element within the groove.

In its intended use, the spring latching element is inserted into or removed from the groove by positioning the central axis of the spring latching element on the circumference of the circular area of the groove at approximately 0°, which corresponds to the insertion angle of the spring latching element. The angle range of the insertion angle can also deviate from this. For example, the insertion angle can have a range of 340° to 20°, where the range of the insertion angle depends on the design of the spring latching element, in particular the thickness of the spring latching element, as well as the width of the groove opening.

The spring latching element may have a spring latching element upper edge (4.11), which separates the upper side of the spring element from the convex curvature of the spring element. The spring latching element upper edge is configured to contact the second groove latch projection to limit partial rotation of the spring latching element about the longitudinal axis of the spring latching element. The spring latching element upper edge can be designed as a second spring element latching recess, so that the second groove latch projection can engage into it.

In an embodiment, the spring latching element has a second spring latching element depression, or the upper edge of the spring latching element is configured as a second spring latching element depression. A greater number of spring latching element depressions or spring latching element projections provides a more stable reversible attachment of the spring latching element within the groove and offers additional pressure points for haptic feedback.

In another embodiment, the second groove latch projection is form-fittingly engageable with the second spring latching element depression. This configuration provides additional defined haptic feedback and a more stable force-fit connection of the spring latching element with the groove. In another embodiment, a third spring latching element depression demarcates the convex curvature of the spring latching element from the underside of the spring latching element and can be designed as a spring element lower edge.

In an embodiment, the spring latching element has a third spring latching element depression, which is located distally to the groove opening edge support rail and separates the convex curvature from the underside of the spring latching element.

In a preferred embodiment, the third groove latch projection is form-fittingly engageable with the third spring latching element depression. This enables additional defined haptic feedback and a more stable force-fit connection of the spring latching element within the groove.

One or more spring element latching element depressions can also be designed as groove latch projections (5.1, 5.2, 5.3) and engage into groove latch recesses (6.1, 6.2, 6.3). To allow a groove latch projection to engage into a groove latch recess, the spring latching element projection, for example, can be mounted within the spring latching element via a tension spring (7.0), so that the tension spring of the spring element projection is tensioned when inserted into the groove and relaxes upon reaching the groove latch recess, thereby pushing the spring element projection into the groove latch recess and thus establishing a form-fit connection of the mounting slide with the profile rail. In modified embodiments, at least one or all groove latch recesses can be designed as groove latch projections and/or at least one or all spring element latching recesses can be designed as spring element latching projections and have a tension spring. Instead of a tension spring, for example, a metal bracket can also be used. The advantage here is that fewer parts need to be used, making the device less susceptible to wear.

In a preferred embodiment, the longitudinal axis of the groove opening edge support rail (3.8) is alignable parallel to the groove opening edge (3.7). This arrangement allows the spring latching element to be inserted into the groove, particularly in a resistance-free manner.

In a preferred embodiment, the groove opening edge support rail can be brought into contact with the groove opening edge, where the contact limits the partial rotation.

In a preferred embodiment, the second groove latch projection, oriented distally to the groove opening edge support rail, can be brought into contact with the upper edge of the spring latching element, where the contact limits the partial rotation.

To ensure proper use during intended operation, the groove opening edge support rail axis is arranged parallel to the groove opening edge for inserting the spring latching element into the groove. To form-lockingly connect the mounting slide, namely the spring latching element with the groove, it is envisioned that the spring latching element is rotated around its longitudinal axis until at least one groove latch projection engages into at least one spring latching recess. The partial rotation of the spring latching element around its longitudinal axis results in a reduced angle between the mounting element central axis and the previously defined angle of 0°, which marks the groove opening center. In intended use, the partial rotation concludes when the groove opening edge support rail contacts the groove opening edge and/or at least one groove latch projection form-lockingly engages into a spring element latching recess. In one embodiment, the groove latch projection nearest to the groove opening edge support rail engages into the first spring element latching recess, while a groove latch projection positioned distally to the groove opening edge support rail contacts the upper edge of the spring latching element. For this, it need not encompass a spring latching element depression. The limit of partial rotation is then defined by the upper edge of the spring latching element not moving beyond the second groove latch projection. In another embodiment, the upper edge of the spring latching element is designed as a second spring latching element depression (4.9), into which the second groove latch projection engages. This second spring latching element depression may be designed to overcome a pressure point upon engagement, to induce haptic feedback.

According to a preferred embodiment, the material of the profile rail and/or the mounting slide has metal, plastic, glass, ceramic, composite material, wood, or a combination of at least one of the aforementioned.

The material of the profile rail and/or the mounting slide can have a metal (e.g., aluminum, copper, iron, zinc, magnesium, vanadium, titanium, or alloys thereof as well as alloys with additional elements such as carbon, oxygen, nitrogen, manganese, chrome, nickel). Furthermore, the material can have a plastic, preferably a thermoplastic (e.g., polyolefins, polyamides, polyesters, polyacetals, polyacetates, polyurethanes). Additionally preferred, a plastic material can be used that is advantageously temperature-resistant (e.g., flame-retardant) and/or chemical-resistant (e.g., resistant to aggressive chemicals like acids and/or bases). An inventive material can be painted. Specifically, a metal can be anodized or browned with iron-containing materials, so that the material/metal has increased corrosion protection, for example, against corroding substances (e.g., acids, bases).

It is known to the person skilled in the art that a variety of materials, especially metals, can be used as material for profile rails or mounting slides.

It is conceivable that the material comprises glass or a ceramic (e.g., borosilicate glass, alumina ceramic) or a composite material. The use of glass advantageously provides high resistance to temperatures and aggressive chemicals such as acids or bases. Furthermore, a material can also have a resin (e.g., epoxy resin) or a wood (e.g., maple, pine, beech). A material can also be multilayered. For example, a mounting slide can comprise a metal core encased in plastic, which advantageously can increase the stability of the device.

In an embodiment, the material of the profile rail is multi-layered. A multi-layered construction can also be understood as a coating. It is conceivable that the profile rail is formed from a defined metal, which is coated with plastic. This can prevent corrosion of the metal, for example. The profile rail, particularly the groove, may also be coated with a low-friction plastic such as polytetrafluoroethylene, to advantageously enable the sliding of the spring latching element within the groove.

In one embodiment, the spring latching element and the groove opening edge support rail are made of metal, while the mounting element is made of plastic. A spring latching element and a groove opening edge support rail made of metal advantageously increase the stability of the mounting slide. In another embodiment, the mounting slide can be entirely made of metal, resulting in the same advantage.

In one embodiment, the profile rail and/or the mounting slide comprise at least one magnetic element. Various magnetic elements are well known to those skilled in the art. For instance, a magnetic element can be a permanent magnet, or it can also be a material (e.g., a metal) to which the permanent magnet adheres. In addition to a form-fit connection established by the engagement of at least one groove latch projection into at least one spring latching recess, at least one magnetic element may further allow a force-fit connection of the mounting slide with the profile rail. Advantageously, this allows the mounting slide to be connected to the profile rail in a force-fit manner. This may be desirable, for example, if different mounting slides are to be arranged in stock on the profile rail without the mounting slides being fixed within the groove. Thus, it is also conceivable that the mounting slides can adhere to a flat metal element, for example, a metal wall, until they are needed.

In one embodiment, a magnetic element is embedded along the groove opening edge, while the groove opening edge support rail and/or the mounting element comprises another magnetic element. Advantageously, this can prevent the unwanted slipping of the mounting slide within the groove, while still advantageously allowing desired manual movement. A magnetic element may also be included in the spring latching element. The arrangement of at least one magnetic element on or in the spring latching element offers the advantage that the spring latching element can be applied to the profile rail with its top or bottom side to establish a magnetic connection, thereby preventing slippage of the spring latching element on the profile rail or within the groove.

In an embodiment, the profile rail and/or the mounting slide has a friction-reducing or friction-increasing agent. Related advantages are described further below.

In one embodiment, the profile rail and/or the mounting slide comprises at least one friction-reducing agent, which is designed to reduce the friction between the mounting slide and the profile rail. For the purpose of the invention, a friction-reducing agent can, for example, have a ball bearing, wheel bearing, or roller bearing. Thus, the groove can comprise at least one groove guide rail, and the spring latching element can comprise at least one ball bearing, wheel bearing, or roller bearing, whose movable elements are arrangeable and guidable within the groove guide rail. Here, the expert can select the arrangement of the groove guide rail and the arrangement of the ball, wheel, or roller bearings in such a way that optimal low-friction movement of the mounting slide is enabled when it is loaded with a weight. Advantageously, this results in the mounting slide being guidable with low friction within the groove along the profile rail even under heavy load.

In an alternative embodiment, the profile rail and/or the mounting slide may have a friction-increasing agent. Thus, within the groove and/or along the groove opening edge, rubber lips can be embedded that extend along the longitudinal axis of the groove. Alternatively, plastics such as thermoplastics or elastomers are also suitable. Advantageously, this can prevent unwanted slipping of the mounting slide within the groove, while still advantageously allowing a desired manual movement. Particularly when the mounting slide is loaded with a weight, the mounting slide is pressed more firmly against the friction-increasing material, so that unwanted slipping is further advantageously prevented.

Alternatively, the profile rail and/or the mounting slide may also have a friction-reducing material. Thus, the mounting slide, in particular the spring latching element and/or the groove opening edge support rail, may have a low-friction plastic (e.g., polytetrafluoroethylene (PTFE)). Advantageously, this allows the mounting slide, even when loaded with a weight, to be moved more easily within the groove along the length of the profile rail. PTFE is particularly advantageous because it is a very inert material that is acid and alkali resistant and is therefore particularly suitable for use in chemical or biological laboratory operations.

A friction-increasing agent advantageously ensures that the spring latching element does not slip within the groove. Thus, the groove can be oriented at any angle in space.

For the same reason, according to one embodiment, the material of the profile rail and/or the spring latching element has a friction-increasing material, or a friction-increasing coating with a material such as a friction-increasing plastic or rubber.

In an alternative embodiment, the profile rail may have at least one slide locking recess (2.3). This is essentially a recess located within the profile rail surface. A slide locking recess is preferably arranged parallel to a similarly designed slide locking recess. Along the groove opening edge, multiple slide locking recesses can be arranged at equal or unequal distances. A slide locking recess can be fluidly connected to the groove cavity. In this or a different embodiment, the mounting slide may have at least one slide locking attachment (4.14), which can be designed to engage in the slide locking recess, resulting in an additional form-fitting connection. Advantageously, this can prevent unwanted slipping of the mounting slide within the groove, while still advantageously allowing a desired manual movement by lifting the slide locking projection out of the slide locking recess for the duration of the manual movement.

Under preferred configurations, the slide locking recess is positioned on the profile rail in a location that, during intended use of the device, is situated beneath the groove, i.e., towards the center of gravity. This positioning advantageously allows for the weight of an object mounted on the mounting slide, particularly in the case of heavy objects, to be supported and/or transferred effectively. Combinations of friction-reducing agents, friction-increasing agents, or friction-increasing materials are conceivable and not limited to those mentioned here. The expert can modify the agents mentioned above accordingly. This applies in particular to the type of plastics used.

When used as intended, the partial rotation described above continues until a locking position of the spring latching element is reached. The locking position is defined as the position where at least one groove latch projection engages form-fittingly into at least one spring latching element depression and/or a groove opening edge support rail contacts a groove opening edge.

The inventive device can be used for various applications. A preferred application of the device is as a mounting system (8.0) for different objects in chemical or biological laboratory operations. For example, in fume hoods or laminar flow cabinets, there is a particular need for an inventive device on which laboratory equipment or clinical devices can be mounted, where the device is ideally resistant to chemicals, temperature, or radiation (e.g., UV light). For instance, a mounting element can be designed such that an empty or at least partially filled glass flask can be arranged on the mounting system, and the mounting system is designed to stably hold the glass flasks regardless of their fill level. According to a preferred embodiment of the present invention, the clamp slide rail mounting device, especially the mounting slide (4.0), is thus designed to accommodate a laboratory device or a clinical device, like for example, a test tube, a (glass) flask, a column, a Buchner funnel, a (separating) funnel, a measuring pipette (like dropper, "Eppendorf pipette"), a tip box, a syringe box, a perfusor, a waste container. Preferably, the inventive clamp slide rail mounting device, especially the mounting slide (4.0), has a receptacle, a recess, a magnetic holding means, a clamping element, or a combination thereof, which is designed to accommodate or be coupled with a corresponding laboratory device or a clinical device (as listed above as examples).

Furthermore, the device may be designed to hold and/or store other objects, such as tools, surgical materials, cutlery, or dishes. The stored or held items can be easily transferred to another location, for example, within a workshop or laboratory. For instance, a supporting or insertion unit may be provided, on which the object can be stored or into which the object can be inserted and/or plugged.

Further, it is conceivable that the device is used to position pieces of furniture in a room. For instance, a seat (9.0) could be designed to comprise at least one mounting slide according to the invention. The profile rail could be attached to a wall in a room or as part of a mounting system, for example, in a means of transport. The advantage of this is that the seat can be very easily attached to the profile rail, but at the same time is movable along the length of the groove. At the same time, this allows the degree of furnishing or the number of seats and the spacing of the seats from each other to be adjusted as required. Furthermore, the device can also be used for, for example, tables, cabinets, or shelves. Thus, profile rails could be arranged at different heights in a room. A shelf or a cabinet element can comprise at least one mounting slide according to the invention, whereby the shelf or cabinet element can be attached to the profile rail. Especially when a friction-reducing agent is used, the pieces of furniture can be moved along the profile rail. This advantageously allows a room to be individually designed without the need for further holes to be drilled into the walls for attaching the pieces of furniture. Thus, the degree of furnishing or the number of pieces of furniture or shelves and the spacing of the pieces of furniture or shelves from each other can be adjusted as required. It is conceivable that the distances between the profile rails are standardized so that furniture manufacturers can adapt the design of the furniture to this. This advantageously means that, for example, when moving to a new apartment, the pieces of furniture can simply be arranged on the profile rails of the new apartment. The profile rails can be arranged horizontally, vertically, or at any angle in the room.

Additionally, it is conceivable that the device according to the invention may find application in both wet and dry construction. For example, flat elements (e.g., plasterboards) may have mounting elements according to the invention, with which they are attached to profile rails positioned in the space according to the invention. The use of the device according to the invention is not limited to the described applications. Furthermore, the device can also be configured kinematically in reverse. This is the case, for example, when a profile rail or a flat element (e.g., a wall) has a spring latching element instead of a groove, with the mounting slide including a groove with at least one groove latch projection. This may be desirable, especially in areas where, for example, high purity requirements are demanded, since a spring latching element protruding into the surrounding space is advantageously simpler to clean (e.g., with water) than a groove with a groove depth. Such an arrangement may be desirable, for example, in the gastronomic sector or in slaughterhouses. Furthermore, it can advantageously prevent objects from falling into a groove. For example, when handling pipettes, it may happen that discarded pipette tips move in an unforeseen direction and possibly fall into a groove of a profile rail carrying the mounting slide. This is advantageously prevented by a kinematic reversal.

Furthermore, as described elsewhere, the groove base of the profile rail may have convex curvatures (e.g., groove latch projections) that are preferably complementary to a curvature, particularly a concave curvature, on the spring latching element of the mounting slide. Conversely, it may also be provided, as described elsewhere, that the spring latching element of the mounting slide features convex curvatures (e.g., spring latching element projections), which are preferably complementary to a curvature, particularly a concave curvature, on the groove base of the profile rail.

An object that facilitates the attachment of items using a clamp slide rail mounting device may, for example, be equipped with one or more profile rails to deploy one or more mounting slides simultaneously or at different positions on the object.

The invention also relates to a combination product for reversibly attaching a mounting slide to a profile rail, comprising a profile rail that has at least one groove and a mounting slide, where the mounting slide can be form-fittingly connected to the groove via the spring latching element, with the spring latching element being freely insertable into the groove prior to establishing the form-fitting connection and partially rotatable around the spring latching element longitudinal axis until a locking position is reached, as described above.

The invention further relates to a method for reversibly attaching a mounting slide to a profile rail, where in the first step, a clamp slide rail mounting device, including a profile rail with at least one groove and a mounting slide with at least one spring latching element and at least one mounting element, is provided. In the second step, the spring latching element is positioned within the groove, where it can be inserted into the groove without resistance prior to establishing a form-fitting connection and is partially rotatable around the spring latching element longitudinal axis. In the third step, a form-fitting connection is established by rotating the spring latching element until at least one groove latch projection, preferably the first groove latch projection, engages form-fittingly into a spring latching element depression, preferably the first spring latching element depression, and the mounting element contacts a groove opening edge. In the fourth step, the form-fitting connection is disengaged by reversing the aforementioned steps.

The invention also relates to the use of the device or combination product described herein for reversibly attaching a mounting slide to a profile rail and/or for attaching items at a height in space.

Moreover, the invention relates to a mounting slide described above for reversibly attaching the mounting slide in a groove of a profile rail, particularly in a groove of a profile rail described above, where the mounting slide has at least one spring latching element described above, which has at least one spring latching element depression and/or at least one spring latching element projection, where through the spring latching element depression and/or the spring latching element projection can be brought into operational connection with at least one groove latch projection and/or with a groove opening edge described above, where the operational connection is configured to allow a reversible attachment of the mounting slide device within the groove as described above. In particular, the mounting slide has at least one mounting element and at least one spring latching element positioned opposite the mounting element, where the mounting slide has a groove opening edge support rail, and the spring latching element is designed such that it is partially rotatable within the groove of the profile rail around a spring latching element longitudinal axis, where the spring latching element has at least one spring latching element depression and/or at least one spring latching element projection, and where the spring latching element depression and/or the spring latching element projection are designed such that they can be brought into operational connection with at least one groove latch projection and/or with a groove opening edge of the profile rail, where the operational connection is configured to allow a reversible attachment of the mounting slide within the groove of the profile rail. Further advantageous embodiments of the mounting slide are defined herein in the description and in the claims.

In particular, under operational connection, it is understood that the spring latching element of the mounting slide is inserted into the groove such that a reversible attachment of the mounting slide within the groove, particularly as described above, is enabled.

Furthermore, the invention relates to the use of the mounting slide described above for reversibly attaching the mounting slide within a groove of a profile rail, preferably a groove described above.

Finally, it should be noted that the skilled person recognizes that he can select the individual features and configurations of the invention depending on the field of application or need, or choose their specific configuration, or adapt them to one another, so that all features mentioned in the application documents, and in particular in the dependent claims, despite the formal reference back to one or more specific claims, should also be granted independent protection individually or in any combination.

Further advantages, features, and possible applications of the present invention also emerge from the following description of exemplary embodiments and the drawings. Herein, all described and/or visually represented features, either individually or in any combination, constitute the subject matter of the present invention, even independently of their compilation in the claims or their back-references.

EXEMPLARY EMBODIMENTS

For the elucidation of the basic principle of the device according to the invention, the present invention is described below based on exemplary embodiments with reference to the accompanying drawings. It should be noted that the ratios and dimensions of the components according to the invention do not have to correspond to reality for the sake of representation.

This shows

FIG. 1A: An embodiment of a profile rail with an uninserted mounting slide in cross-sectional view.

FIG. 1B: An embodiment of a profile rail with an inserted and affixed mounting slide in cross-sectional view.

Figure 2:
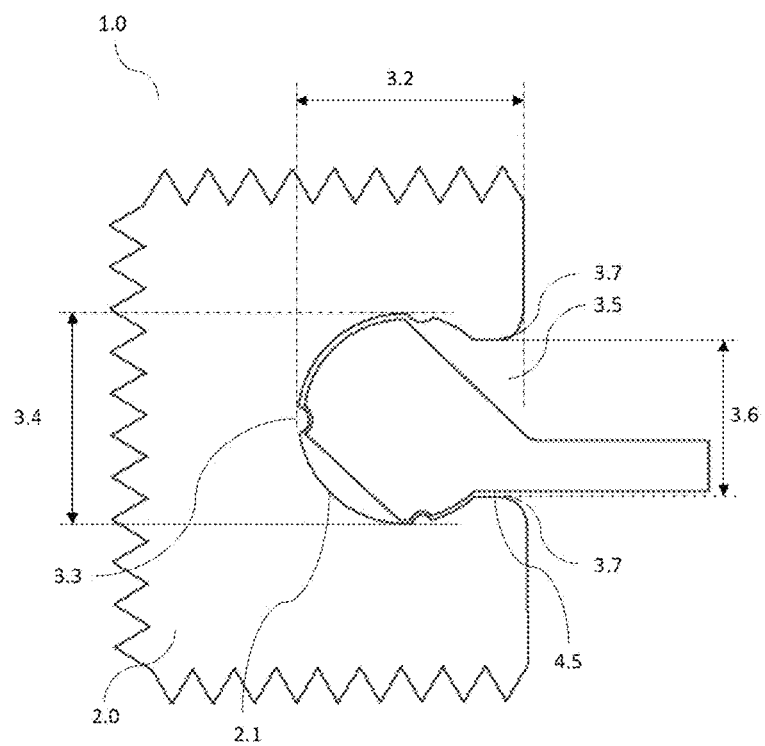

FIG. 2: An embodiment of a profile rail with inserted and affixed mounting slides in cross-sectional view.

Figure 3:
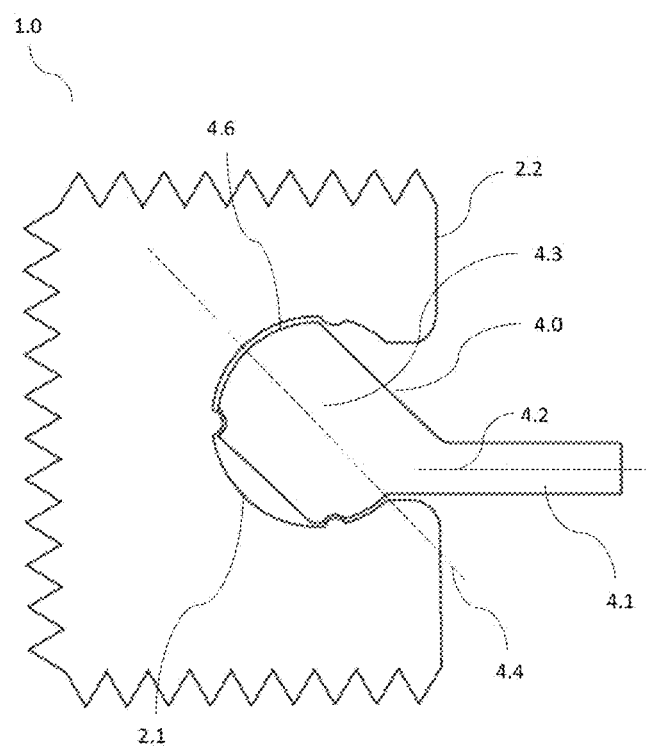

FIG. 3: An embodiment of a profile rail with inserted and affixed mounting slides in cross-sectional view.

Figure 4:
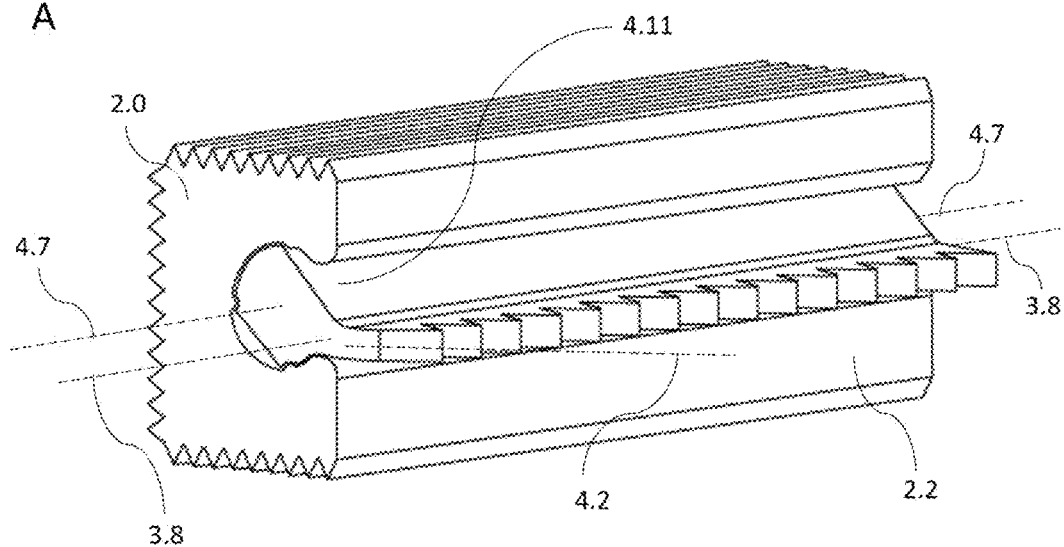
Figure 4:
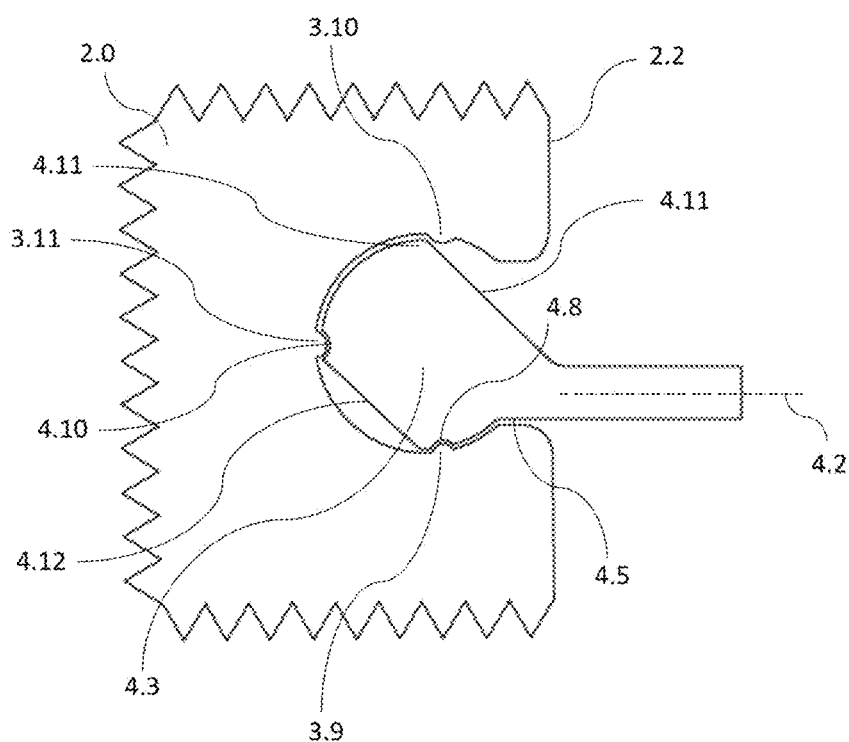

FIG. 4A: An embodiment of a profile rail with inserted and affixed mounting slides in a perspective view.

FIG. 4B: An embodiment of a profile rail with inserted and affixed mounting slides in cross-sectional view.

Figure 5:
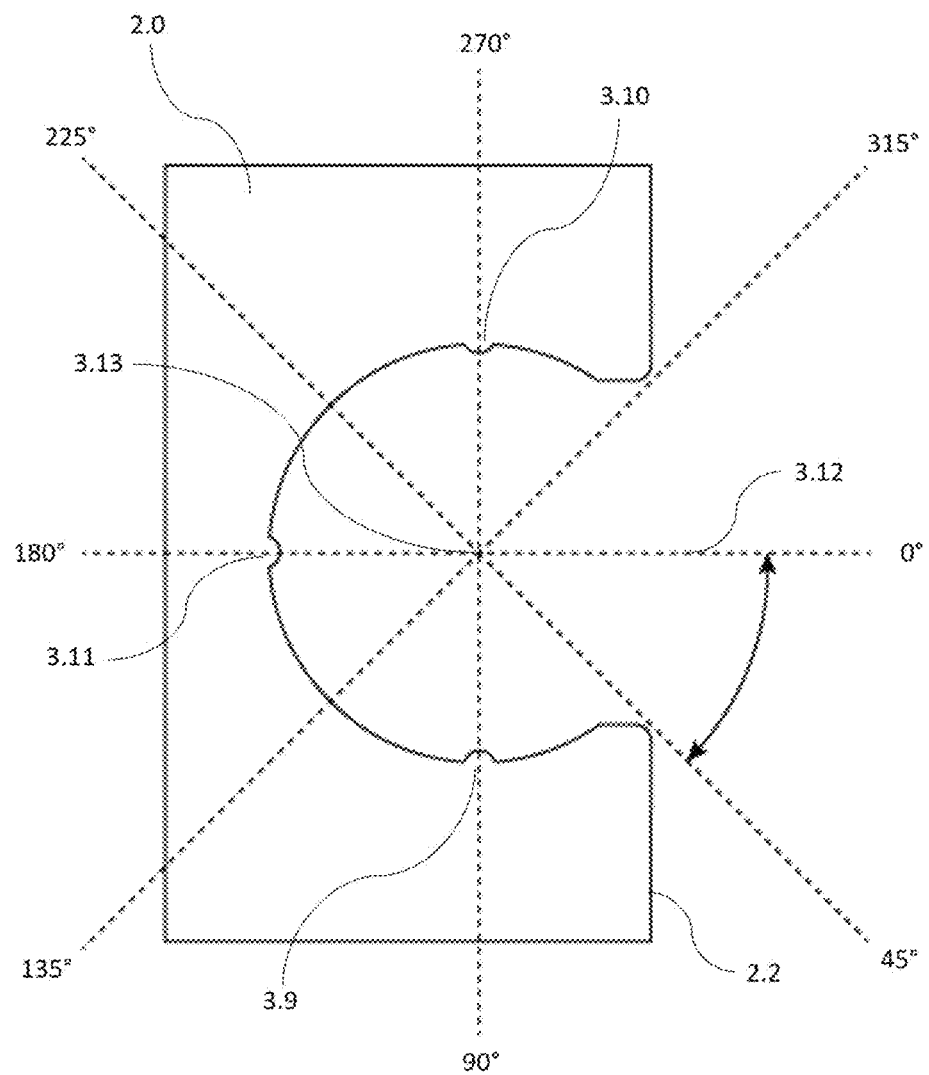

FIG. 5: An embodiment of a profile rail with indicated angle positions in cross-sectional view.

FIG. 6A-D: Various embodiments of a profile rail and mounting slides in cross-sectional view.

Figure 7:
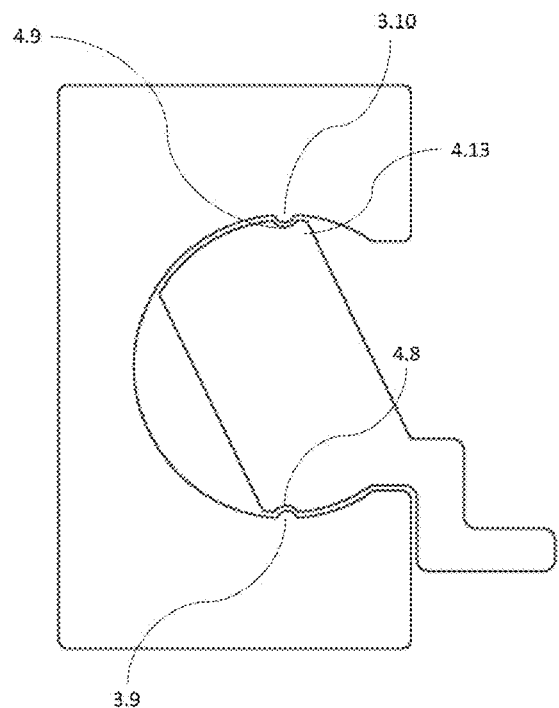

FIG. 7: An embodiment of a profile rail with inserted and affixed mounting slides in cross-sectional view.

Figure 8:
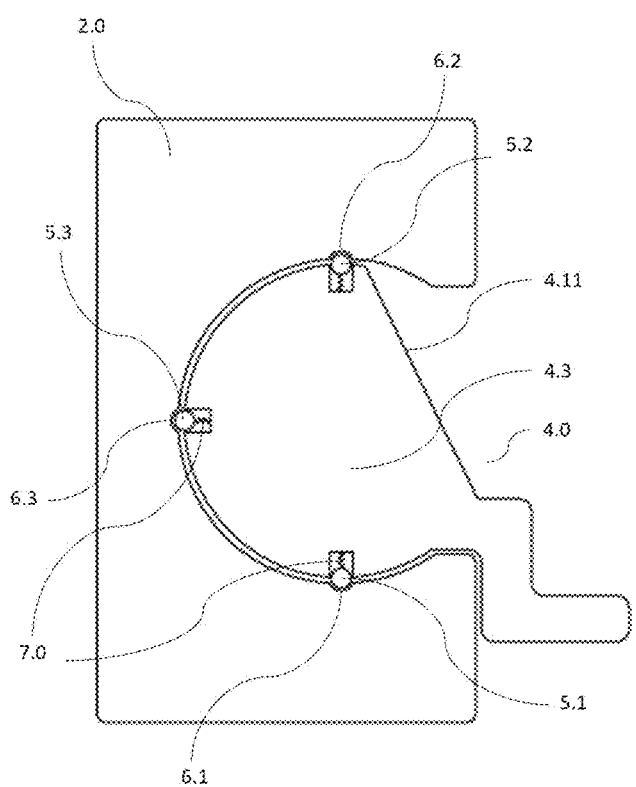

FIG. 8: An embodiment of a profile rail with inserted and affixed mounting slides in cross-sectional view.

FIG. 9A: An embodiment of a profile rail with inserted and affixed mounting slides in cross-sectional view.

FIG. 9B: An embodiment of a profile rail with slide locking recesses in a perspective view.

Figure 10:
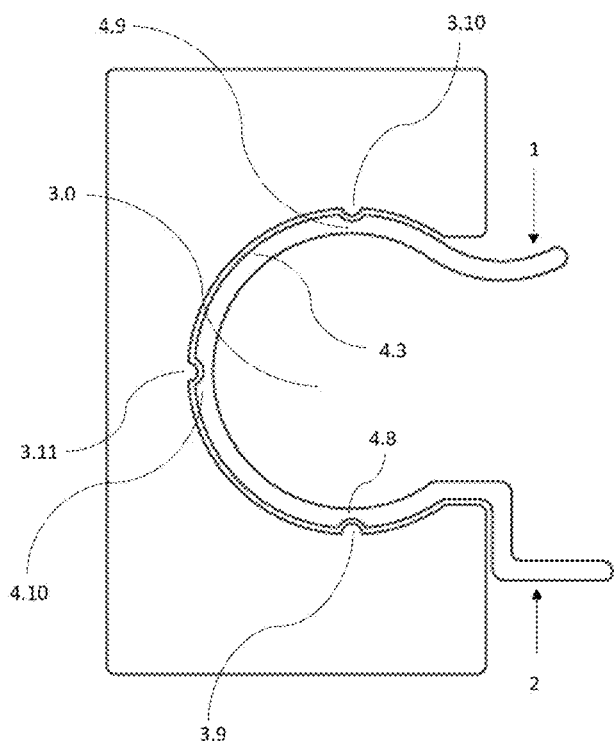

FIG. 10: An embodiment of a profile rail with inserted and affixed flexible mounting slides in cross-sectional view.

Figure 11:
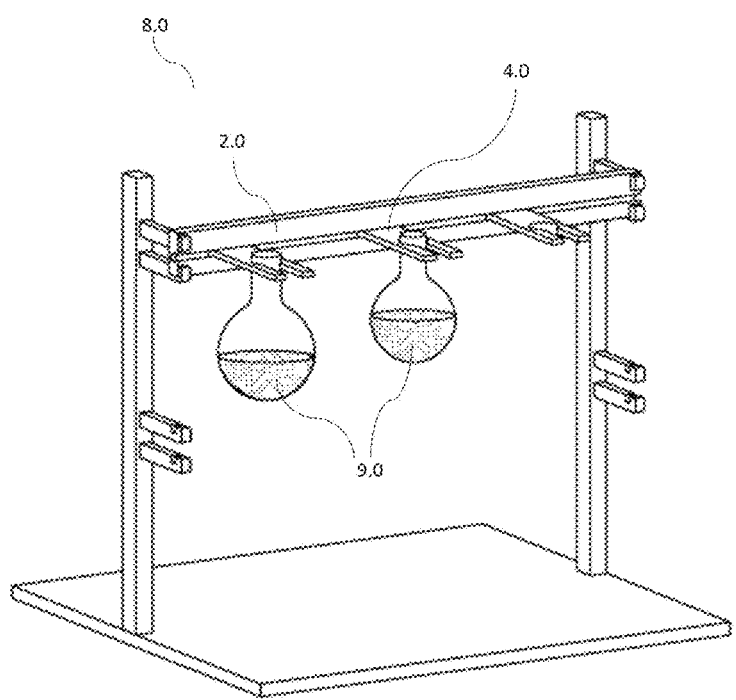

FIG. 11: An embodiment of the profile rail with a mounting slide as a laboratory equipment/flask holder in a perspective view.

Figure 12:
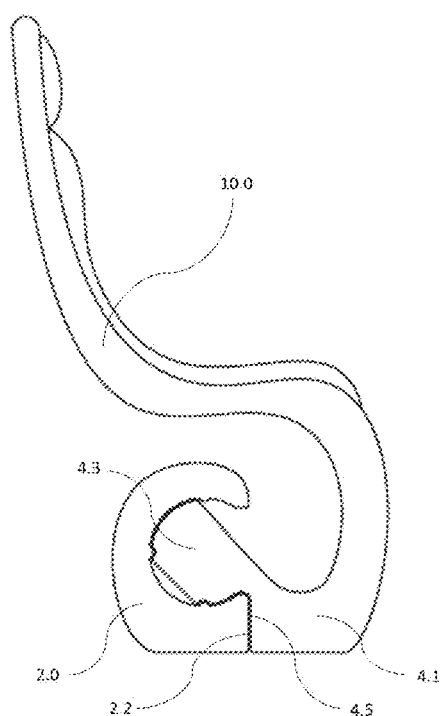

FIG. 12: An embodiment of the profile rail with affixed flexible mounting slides in cross-sectional view, wherein the mounting slide comprises a seat.

Figure 13:
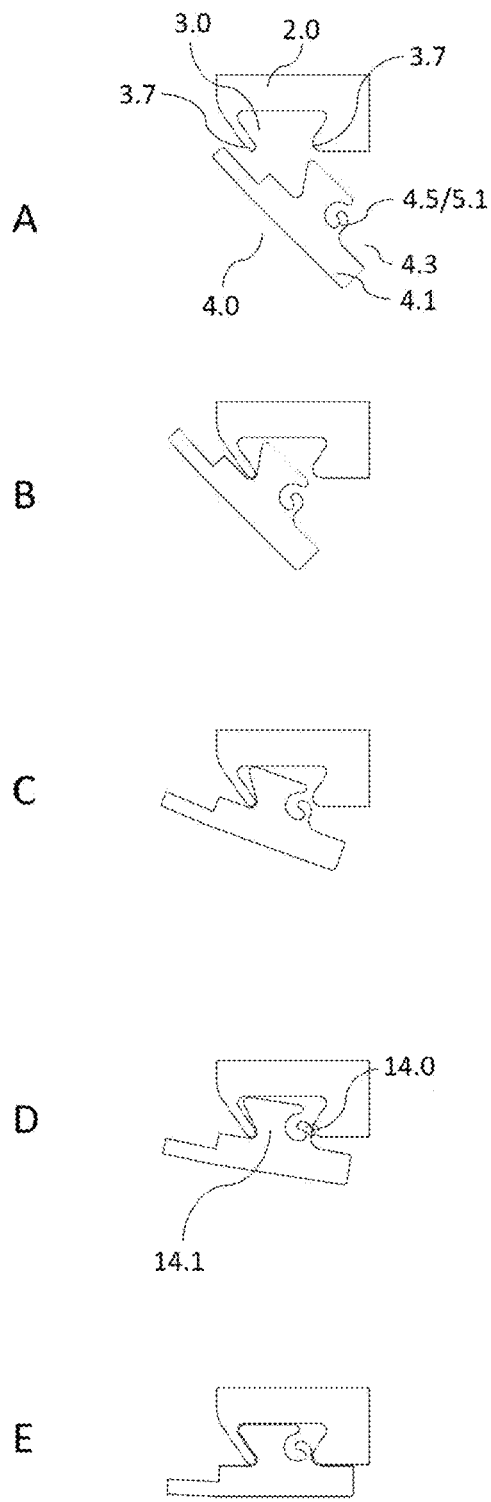

FIGS. 13 A to E: An embodiment of the mounting element (4.0) featuring a groove opening edge support rail (4.5)/ spring latching element projection (5.1) functioning as a pressure contact (14.0), wherein the reversible attachment to the profile rail (2.0) is demonstrated in steps A through E.

Figure 14:
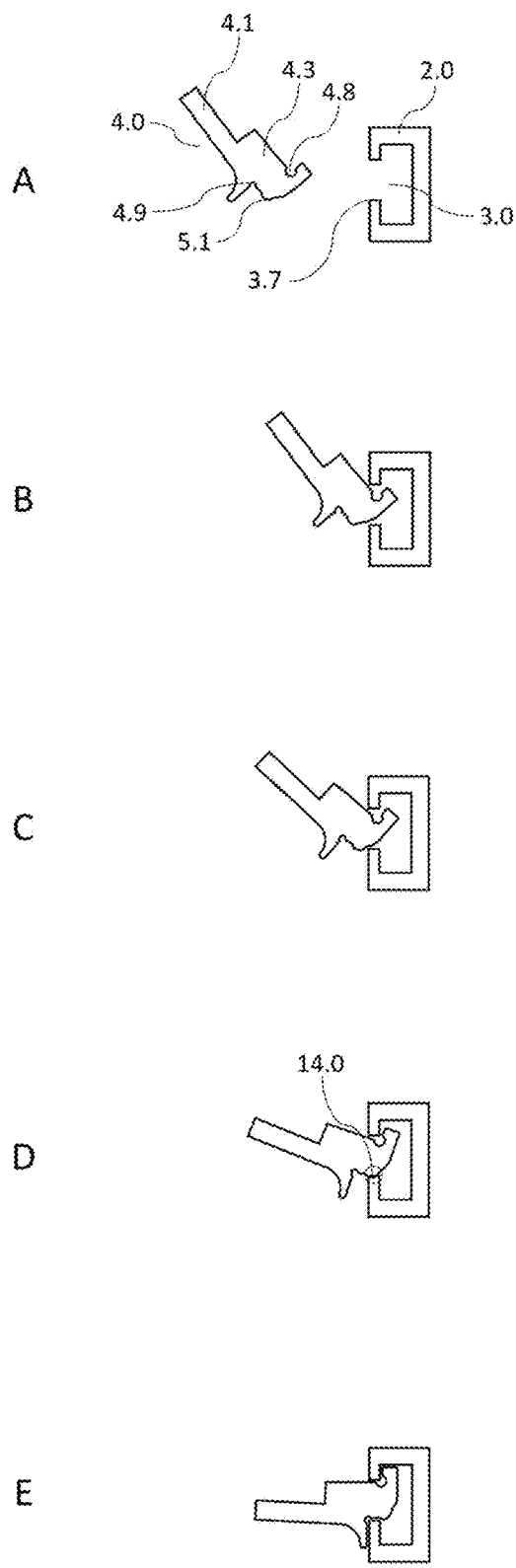

FIG. 14 An embodiment of the mounting element (4.0) with a spring latching element projection (5.1) acting as a pressure contact (14.0), wherein the reversible attachment to the profile rail (2.0) is shown in steps A through E.

FIG. 1A shows an embodiment of the invention comprising a profile rail (2.0) with a groove (3.0) and a mounting slide (4.0) that can be inserted into this groove. The arrow indicates the direction of insertion. FIG. 1B shows a mounting slide (4.0) fixed within the groove (3.0) in a locked position, comprising a mounting element (4.1) and a spring latching element (4.3).

FIGS. 2, 3, 4A, and FIG. 4B depict the same embodiment as FIGS. 1A and 1B, differing for clarity in the number of reference characters shown. The engagement of the groove latch projections causes both a mechanical coupling/form-fit connection of the spring latching element (4.3) with the groove (3.0) and also a tactile feedback, informing the user of successful attachment.

FIG. 5 displays an embodiment of a profile rail (2.0) with illustrated angular positions, where a 0° axis, starting from a 0° angle, is defined as perpendicular to the profile rail surface (2.2). The mounting slide (4.0), not shown here but in the previous figures, is inserted such that the central axis of the spring latching element (4.4) is substantially parallel to the 0° axis. Rotation of the mounting slide (4.0) around the longitudinal axis of the spring latching element (4.7) results in the engagement of the groove latch projections (3.9, 3.11) into the recesses of the spring latching element (4.8, 4.10), and contact between the top edge of the spring latching element (4.13) and the second groove latch projection (3.10), as well as contact between the groove opening edge support rail (4.5) and the edge of the groove opening (3.7).

Figure 6:
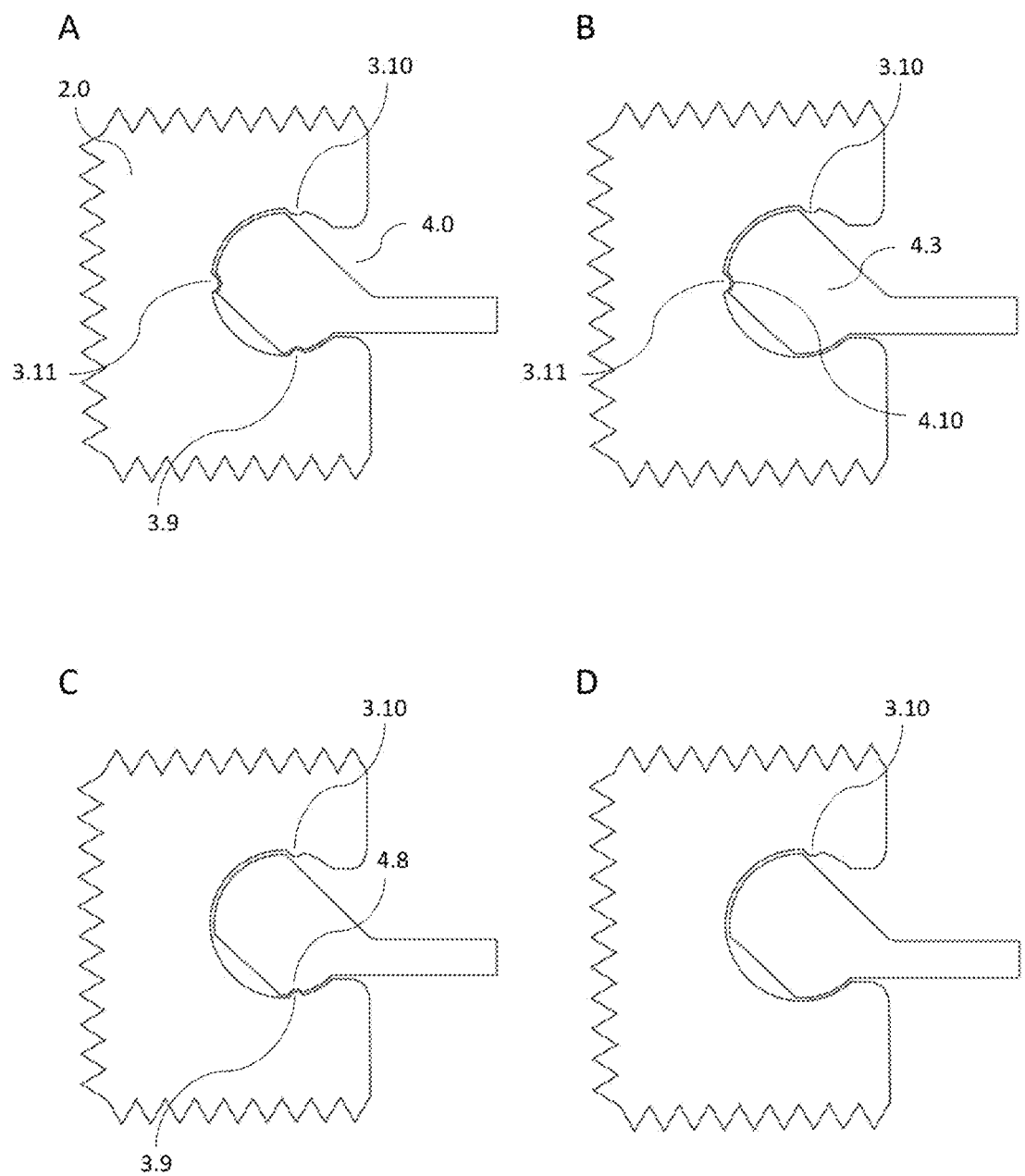

FIG. 6 illustrates various embodiments of the inventive device consisting of a profile rail (2.0) and a mounting slide (4.0), wherein the grooves of the profile rails (2.0) differ in the number of groove latch projections (3.9, 3.10, 3.11) and the spring latching elements (4.3) differ in the number of spring latching element depressions (4.8, 4.10).

FIG. 7 demonstrates another embodiment, wherein the upper edge of the spring latching element (4.13) is configured as a second spring latching element depression (4.9), into which the second groove latch projection (3.10) engages form-fittingly.

FIG. 8 depicts an embodiment where the recesses of the spring latching elements are configured as spring element latching projections (5.1, 5.2, 5.3) that engage in groove latching recesses (6.1, 6.2, 6.3). To enable the engagement of a spring element latching projection (5.1, 5.2, 5.3) into a groove latching recess (6.1, 6.2, 6.3), the spring latching element projection (5.1, 5.2, 5.3) may, for example, be mounted within the spring latching element (4.3) via a tension spring (7.0), so that the tension spring (7.0) tensions the spring element latching projection during insertion into the groove and relaxes upon reaching the groove latching recess (6.1, 6.2, 6.3), thereby pressing the spring element latching projection (5.1, 5.2, 5.3) into the groove latching recess (6.1, 6.2, 6.3) and thus enabling a form-fitting connection of the mounting slide (4.0) with the profile rail (2.0).

Figure 9:
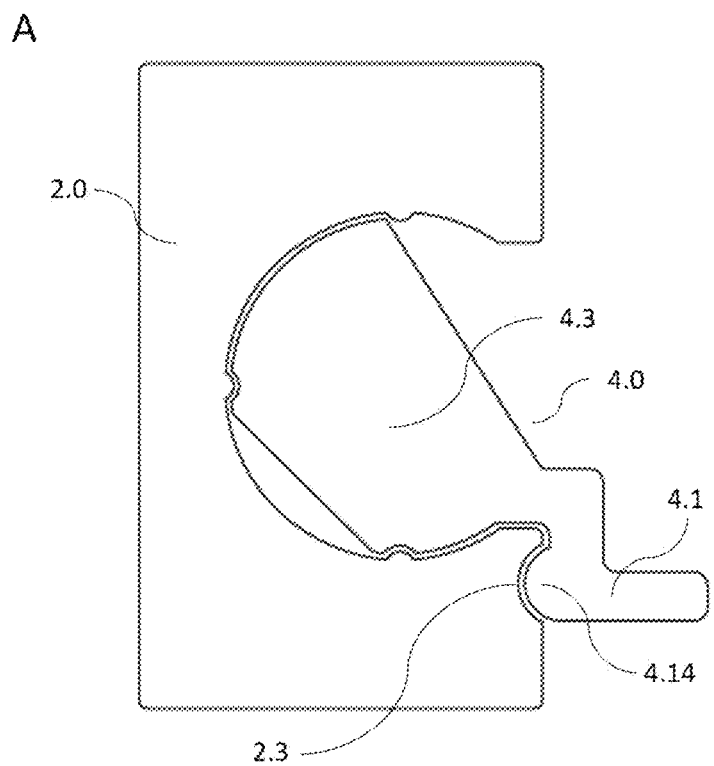
Figure 9:
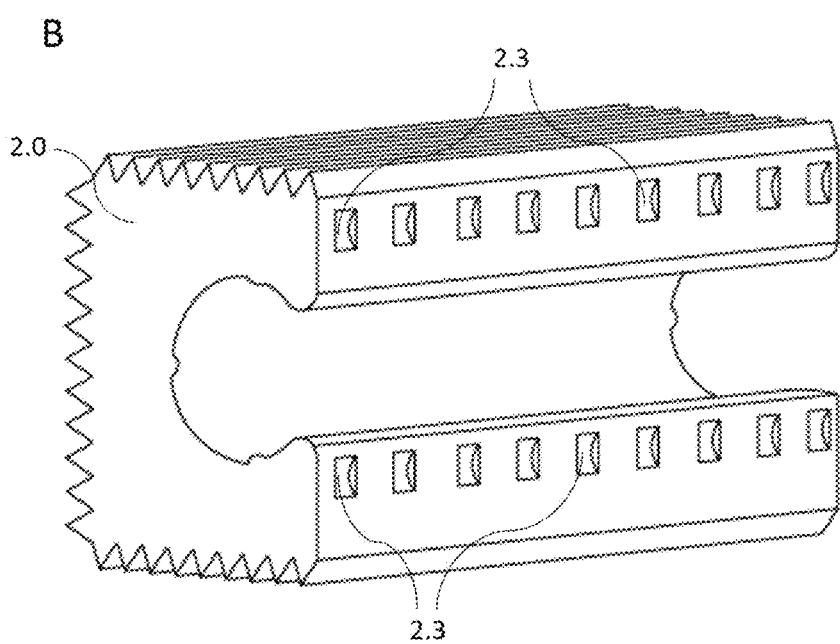

The embodiment shown in FIG. 9 of the device according to the invention illustrates a mounting slide (4.0) secured within a profile rail (2.0), wherein the mounting element (4.1) has a slide locking attachment (4.14) that can engage form-fittingly within the slide locking recess (2.3), ensuring that the mounting slide (4.0) cannot slip along the longitudinal axis of the profile rail (2.0). The slide locking attachment (4.14) and/or the slide locking recess (2.3) may incorporate a magnetic element, advantageously preventing unintentional detachment of the form-fitting connection.

FIG. 10 presents an alternative embodiment of a spring latching element (4.3), made from a flexible material (here: metal). To secure the spring latching element (4.3) within the groove (3.0), the spring latching element is compressed at locations 1 and/or 2 to insert or remove it into the groove (3.0), enabling the engagement of groove latch projections (3.9, 3.10, 3.11) into spring element locking recesses (4.8, 4.9, 4.10). This embodiment brings the advantage of weight/material savings of the spring latching element (4.3). To further reduce the thickness of the spring latching element, the spring latching element depressions (4.8, 4.9, 4.10) could also, as described above, be designed as spring latching element projections, which engage into groove latch recesses.

FIG. 11 depicts an exemplary application of the inventive device as a mounting system for laboratory operations (8.0), where mounting slides (4.0) are secured within the profile rail (2.0), with glass flasks (9.0) suspended therein. The profile rail (2.0) can be positioned at various heights.

FIG. 12 shows an embodiment of the invention, where a seat (10.0) can be secured within the profile rail (2.0). Between the profile rail surface (2.2) and the groove opening edge support rail (4.5), a friction-increasing medium (e.g., rubber coating) may be applied to prevent the unwanted slipping of the seat (10.0) under load. Alternatively, the mounting element (4.1), as illustrated in FIG. 9, may comprise a slide locking attachment (4.14) engaging into a slide locking recess (2.3).

FIGS. 13 A to E show an embodiment of the mounting element (4.0) with a groove opening edge support rail (4.5)/spring latching element projection (5.1) acting as a pressure contact (14.0), where the reversible attachment to the profile rail (2.0) is shown in steps A to E. The spring latching element (4.3) of the mounting element (4.0) is inserted into the groove (3.0) of the profile rail (2.0) until the pressure contact (14.0) is reached. This is overcome by further inserting and partially rotating the spring latching element (4.3) about the unillustrated central axis (4.4) of the spring latching element (4.3), generating a tactile feedback while the groove opening edge support rail (4.5)/the spring latching element projection (5.1) is pressed towards or away from the spring latching element center (14.1), depending on the shape and tolerances of the groove opening edge (3.7) and the design of the groove opening edge support rail (4.5)/the spring latching element projection (5.1). In step E, the mounting element (4.0) is connected to the profile rail (2.0).

FIGS. 14 A to E also show an embodiment of the mounting element (4.0) with a pressure contact (14.0) (shown within the circle) acting as a spring latching element projection (5.1), where the reversible attachment to the profile rail (2.0) is shown in steps A to E. The spring latching element (4.3) of the mounting element (4.0) is inserted into the groove (3.0) of the profile rail (2.0) until the pressure contact (14.0) is reached. This is overcome by further inserting and partially rotating the spring latching element (4.3) about the unillustrated central axis (4.4), generating tactile feedback, depending on the shape and tolerances of the groove opening edge (3.7) and the design of the spring latching element projection (5.1). In step E, the mounting element (4.0) is connected to the profile rail (2.0). It is noted here that the first spring latching element depression (4.8) and the second spring latching element depression (4.9) themselves do not contribute to tactile feedback. In this case, both provide a space in which the groove opening edge can fit.

| | Reference Character List |
|---|---|
| 1 | Clamp slide rail mounting device |
| 2.0 | Profile rail |
| 2.1 | Concave curvature |
| 2.2 | Profile rail surface |
| 2.3 | Slide locking recess |
| 3.0 | Groove |
| 3.1 | Groove cavity |
| 3.2 | Groove depth |
| 3.3 | Groove base |
| 3.4 | Groove width |
| 3.5 | Groove opening |
| 3.6 | Groove opening width |
| 3.7 | Groove opening edge |
| 3.8 | Groove opening edge support rail longitudinal axis |
| 3.9 | First groove latch projection |
| 3.10 | Second groove latch projection |
| 3.11 | Third groove latch projection |
| 3.12 | Groove opening center |
| 3.13 | Groove center |
| 4.0 | Mounting slide |
| 4.1 | Mounting element |
| 4.2 | Mounting element central axis |
| 4.3 | Spring latching element |
| 4.4 | Spring latching element central axis |
| 4.5 | groove opening edge support rail |
| 4.6 | Convex curvature |
| 4.7 | Spring latching element longitudinal axis |
| 4.8 | First spring latching element recess |
| 4.9 | Second spring latching element recess |
| 4.10 | Third spring latching element recess |
| 4.11 | Spring latching element top surface |
| 4.12 | Spring latching element bottom surface |
| 4.13 | Spring latching element upper edge |
| 4.14 | side locking Attachment |
| 5.1 | First spring latching element projection |
| 5.2 | Second spring latching element projection |
| 5.3 | Third spring latching element projection |
| 6.1 | First groove latching recess |
| 6.2 | Second groove latching recess |
| 6.3 | Third groove latching recess |
| 7.0 | Tension spring |
| 8.0 | Mounting system for laboratory use |
| 9.0 | Flask |
| 10.0 | Fit |
| 14.0 | Pressure contact |
| 14.1 | Spring latching element center |

The invention claimed is:

1. A clamp slide rail mounting device (1.0) for reversibly mounting a mounting slide (4.0) to a profile rail (2.0),
wherein the device (1.0) has at least one mounting slide (4.0) and at least one profile rail (2.0),
wherein the profile rail (2.0) has at least one groove (3.0),
wherein the groove (3.0) has a groove cavity (3.1), a groove depth (3.2), a groove base (3.3), a groove width (3.4), a groove opening (3.5), and at least one groove opening edge (3.7),
wherein the mounting slide (4.0) is positioned within the groove (3.0),
characterized in that
the mounting slide (4.0) has a mounting element (4.1) and a spring latching element (4.3) positioned opposite to the mounting element (4.1),
wherein the mounting slide (4.0) has a groove opening edge support rail (4.5),
wherein the spring latching element (4.3) within the groove (3.0) is partially rotatable about a spring latching element longitudinal axis (4.7),
wherein the spring latching element (4.3) is reversibly connectable with the groove (3.0),
wherein the profile rail (2.0) is provided with at least one groove latch projection (3.9, 3.10, 3.11) in the groove (3.0), and the spring latching element (4.3) defines at least one spring latching element depression (4.8, 4.9, 4.10) which is operatively connected with the at least one groove latch projection (3.9, 3.10, 3.11) to generate haptic feedback for a user, or wherein the spring latching element (4.3) comprises at least one spring latching element projection (5.1) which is operatively connected with the groove opening edge (3.7) in the groove (3.0) to generate haptic feedback for the user.

2. The device according to claim 1, wherein the groove opening edge support rail (4.5) of the spring latching element (4.3) is configured as a pressure contact, and operatively connected with the groove opening edge (3.7) to generate haptic feedback for the user.

3. The device according to claim 1, wherein the shape of the spring latching element (4.3) and/or the shape of the groove opening edge support rail (4.5) is designed to allow tactile feedback during the reversible connection or during the removal of the mounting slide (4.0) from or into the groove (3.0).

4. The device according to claim 1, wherein the at least one spring latching element depression (4.8, 4.9, 4.10) has a first spring latching element depression (4.8), positioned proximal to the groove opening edge support rail (4.5), and the at least one groove latch projection (3.9, 3.10, 3.11) in the groove (3.0) has a first groove latch projection (3.9) in the groove (3.0), which is disposed inside the first spring latching element depression (4.8).

5. The device according to claim 1, wherein the at least one groove latch projection (3.9, 3.10, 3.11) in the groove (3.0) has a first groove latch projection (3.9) and a second groove latch projection (3.10) in the groove (3.0), wherein these are positioned opposite each other and separated by the groove cavity (3.1); the at least one spring latching element depression (4.8, 4.9, 4.10) has a first spring latching element depression (4.8), and the first groove latch projection (3.9) is disposed inside the first spring latching element depression (4.8); and
wherein a top side of the spring latching element (4.3) is in contact with the second groove latch projection (3.10) in the groove (3.0), or the at least one spring latching element depression (4.8, 4.9, 4.10) further has a second spring latching element depression (4.9), and the second groove latch projection (3.10) in the groove (3.0) is disposed inside the second spring latching element depression (4.9).

6. The device according to claim 1, wherein the cross-section of the spring latching element (4.3) along the spring latching element longitudinal axis (4.7) has a convex curvature (4.6), positioned distal to the groove opening edge support rail (4.5); and the convex curvature (4.6) as a pressure point, which, upon being overcome, generates haptic feedback for the user.

7. The device according to claim 6, wherein the spring latching element (4.3) has a top side (4.11) delimited by a top edge (4.13) from the convex curvature (4.6).

8. The device according to claim 6, wherein the groove (3.0) in the cross-section has a concave curvature (2.1), and the concave curvature (2.1) of the groove (3.0) has a same degree of curvature as the convex curvature (4.6) of the spring latching element (4.3).

9. The device according to claim 8, wherein the arcs describing the convex curvature (4.6) and the concave curvature (2.1) share the same center when the spring latching element is positioned within the groove cavity.

10. The device according to claim 1, wherein the at least one groove latch projection (3.9, 3.10, 3.11) in the groove (3.0) has a first groove latch projection (3.9), a second groove latch projection (3.10) and a third groove latch projection (3.11), the third groove latch projection (3.11) is spaced from the first groove latch projection (3.9) and the second groove latch projection (3.10) and positioned at the groove base (3.3).

11. The device according to claim 6, wherein the at least one spring latching element depression (4.8, 4.9, 4.10) has a third spring latching element depression (4.10), positioned distal to the groove opening edge support rail (4.5) and delineating the convex curvature (4.6) from a bottom side (4.12) of the spring latching element, and the third spring latching element depression (4.10) is operatively connected to a third groove latch projection (3.11) of the at least one groove latch projection (3.9, 3.10, 3.11).

12. The device according to claim 1, wherein the spring latching element (4.3) has a second spring latching element depression (4.9), or wherein the top edge of the spring latching element (4.13) is configured as a second spring latching element depression (4.9).

13. The device according to claim 1, wherein the material of the profile rail (2.0) and/or the mounting slide (4.0) has metal, glass, ceramic, composite material, wood, or a combination of any of the aforementioned materials, and the metal comprises one or more selected from the group consisting of copper, iron, zinc, magnesium, vanadium and titanium.

14. The device according to claim 13, wherein the material of the profile rail (2.0) is multi-layered.

15. The device according to claim 1, wherein the profile rail (2.0) has at least one slide locking recess (2.3) beneath the groove (3.0), and the mounting slide (4.0) comprises at least one slide locking attachment (4.14) inserted to the at least one slide locking recess (2.3) respectively.

16. A combination product for reversibly mounting a mounting slide (4.0) to a profile rail (2.0) comprising:
    a) the profile rail (2.0) including at least one groove (3.0) according to claim 1,
    b) the mounting slide (4.0) according to claim 1, characterized in that
    the mounting slide (4.0) is connectable in a form-fit manner with the groove (3.0) via the spring latching element (4.3), wherein the spring latching element (4.3) is inserted into the groove (3.0) without resistance prior to establishing the form-fit connection and is partially rotatable around the spring latching element longitudinal axis (4.7) until a locking position is reached.

17. A method for reversibly mounting a mounting slide (4.0) to a profile rail (2.0) comprising the following steps:
    a) providing the clamp slide rail mounting device (1.0) according to claim 1, including a profile rail (2.0) with at least one groove (3.0), and a mounting slide (4.0) with a spring latching element (4.3) and at least one mounting element (4.1),
    b) positioning the spring latching element (4.3) within the groove (3.0), wherein the spring latching element (4.3) is inserted into the groove (3.0) without resistance prior to establishing a form-fit connection and is partially rotatable about the spring latching element longitudinal axis (4.7),
    c) establishing the form-fit connection by rotating the spring latching element (4.3) until at least one groove latch projection, preferably the first groove latch projection (3.9), engages into a spring latching element depression, preferably the first spring latching element depression (4.8), and the mounting element (4.1) contacts a groove opening edge (3.7), d) disengaging the form-fit connection by reversing the steps b) and c).

18. The device according to claim 1, wherein the mounting slide (4.0) comprises a metal core encased in plastic.

19. The device according to claim 1, wherein a width of the groove opening (3.5) is at least 15% to 30% smaller than that of the groove width (3.4).

20. The device according to claim 19, wherein a thickness of the spring latching element (4.3) is at least 15% less than the width of the groove opening (3.5).

* * * * *